United States Patent [19]

Chen

[11] Patent Number: 5,174,402
[45] Date of Patent: Dec. 29, 1992

[54] HEIGHT AND WEIGHT MEASURING MACHINE

[76] Inventor: S. T. Chen, 5 Fl., No. 68, Chang Hsin Rd., Taipei, Taiwan

[21] Appl. No.: 743,222

[22] Filed: Aug. 9, 1991

[51] Int. Cl.$^5$ .................................. G01G 19/00
[52] U.S. Cl. ................................................ 177/245
[58] Field of Search ...................................... 177/245

[56] References Cited

U.S. PATENT DOCUMENTS

| | | | |
|---|---|---|---|
| 3,616,690 | 11/1971 | Harden | 177/245 X |
| 3,667,561 | 6/1972 | Hutchinson et al. | 177/245 |
| 4,336,855 | 6/1982 | Chen | 177/245 |
| 4,518,052 | 5/1985 | Chen | 177/245 |
| 4,923,024 | 5/1990 | Ferrer et al. | 177/245 |

FOREIGN PATENT DOCUMENTS

55-12485  1/1980  Japan .................................. 177/245

Primary Examiner—George H. Miller, Jr.
Attorney, Agent, or Firm—Wenderoth, Lind & Ponack

[57] ABSTRACT

A height and weight measuring machine, particularly a height and weight measuring machine comprises a base with a load cell, and an automatic sliding detecting element to measure weight and height of person standing on the load cell, signals detected are transmitted to a remote receiver which has two displays to display the weight and height. The remote receiver is incorporated with a buzzer to give an alert signal upon display of the weight and height. The separate design of the measuring machine and the display unit provides great convenience for measuring weight and height of a number of persons in sequence.

3 Claims, 8 Drawing Sheets

HEIGHT AND WEIGHT MEASURING MACHINE

BACKGROUND OF THE INVENTION (a) Field of the Invention

The present invention provides a height and weight measuring machine comprising mainly a measuring unit and a remote receiver/display. The measuring machine includes a base with a load cell, a vertical aluminum stand extending upwards from the base, a vertical sliding detecting element driven by a motor via a belt to detect height of person standing on the load cell by signal to the decoder when it stops on the person's head, data of the weight and height are transmitted to a receiver where the data are displayed.

(b) Description of the Prior Art

A common height and weight measuring machine in the market is the so-called coin operated type infrared measuring machine which is characterized by its simple mechanical structure for measurement of height. However, in actual operation, result of measurement is not precise because the use of infrared detection could cause deviation due to condition of hairs, such as hair style. Therefore, there is a need for improvement in accuracy.

Moreover, for all the height and weight measuring machines seen in the market, the display is fixed to the machine body, it is quite convenient to read and record the data when height and weight of a number of persons are measured in sequence, such as in the case of medical checkup in school.

SUMMARY OF THE INVENTION

The main objective of the present invention is to provide a height and weight measuring machine which uses a automatic sliding type detecting element to measure precisely the height of body by giving a decoder a signal when it stops on the head of the person to be measured. Such signal is processed and displayed separately.

Another objective of the present invention is to provide a height and weight measuring machine with an separated remote receiver to receive signal from the measuring machine and to display data for the weight and height measured to ease reading and recording of such data, and to facilitate measurement of height and weight for a number of persons in sequence.

Another objective of the present invention is to provide a height and weight measuring machine with motor and decoder not operating coaxially, but both of them are driven via pulley and belt so that vibration of the motor would not affect reading function of the decoder, and hence the signal transmitted from the decoder is accurate.

Another objective of the present invention is to provide a height and weight measuring machine in which a coupler is used for connection between gear and spindle of the decoder so that tension subject by the gear when the gear is engaging with the belt would not affect the spindle of the decoder and hence the reading by the decoder is accurate.

DETAILED DESCRIPTION OF THE PREFERRED EMBODIMENT

Figure 1:
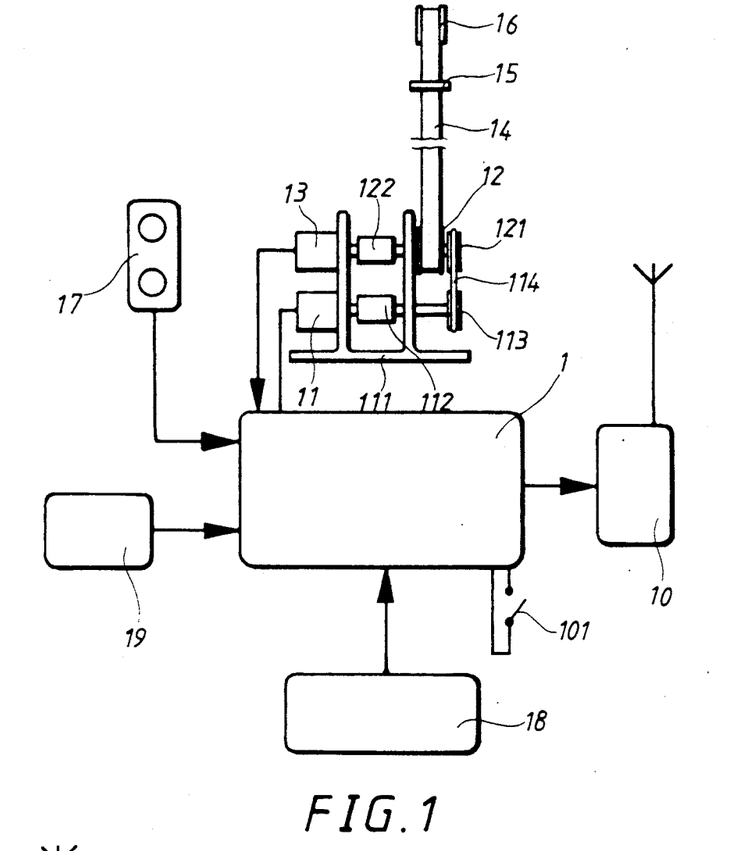
FIG. 1 is a block diagram of a height and weight measuring system according to the present invention.
Figure 2:
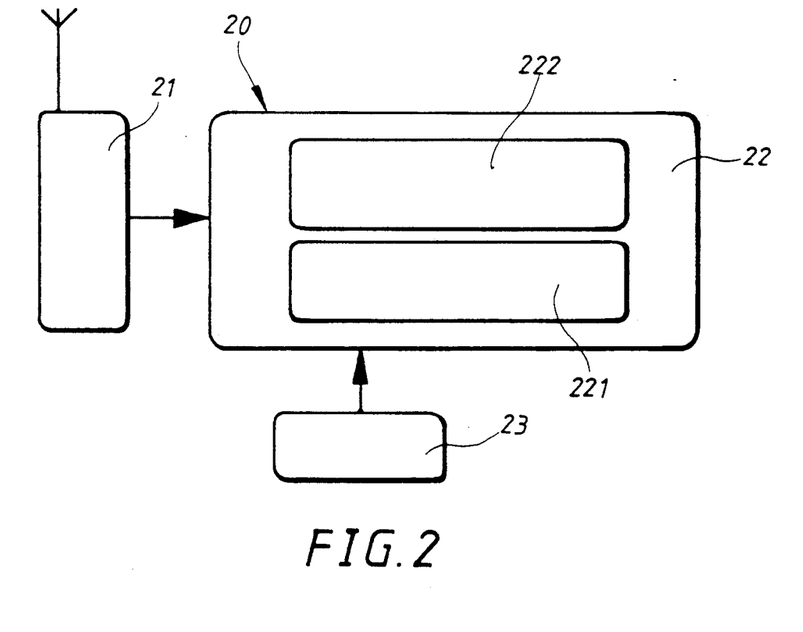
FIG. 2 is a block diagram for the remote receiver according to the present invention.

The height and weight measuring machine according to the present invention comprises mainly a measuring unit and a remote receiver, as shown in FIGS. 1 and 2. The measuring unit has a load cell (18) to measure weight of any person standing on it, a mother board (1) to drive a motor (11) and a gear (12) while consequently driving a belt (14) engaging with a detecting element (15) which is falling down automatically from a pulley (16) till it gets in touch with such person's head, and a decoder (13) driven by the gear (12) coaxially to receive signal from the stop of the said detecting element (15) and output of the load cell (18). The signal from the stop of the said detecting element (15) and the output of the load cell (18) are then processed by the mother board (1) to get data for the actual height and weight of the person. Such data is then transmitted by a transmitter (10) to a remote receiver (20) shown in FIG. 2. The remote receiver (20) includes a receiver (21) to receive RF signal, and incorporates with a processor unit (22) to decode the data to get data of such height and weight, which are then displayed respectively in two displays (221 and 222) for viewing at a distance from the measuring unit.

As shown in FIG. 1, the present invention can be operated manually as well. The mother board (1) can be incorporated with a control button (17) for setting of either automatic mode or manual mode by means of a selector switch (101). If manual mode is selected, the rising and falling of the detecting element (15) can be done manually. The present invention can be incorporated with a buzzer (25) to give an alert signal at the end of data procession to remind the person or recorder to view the result.

Figures 3, 4:
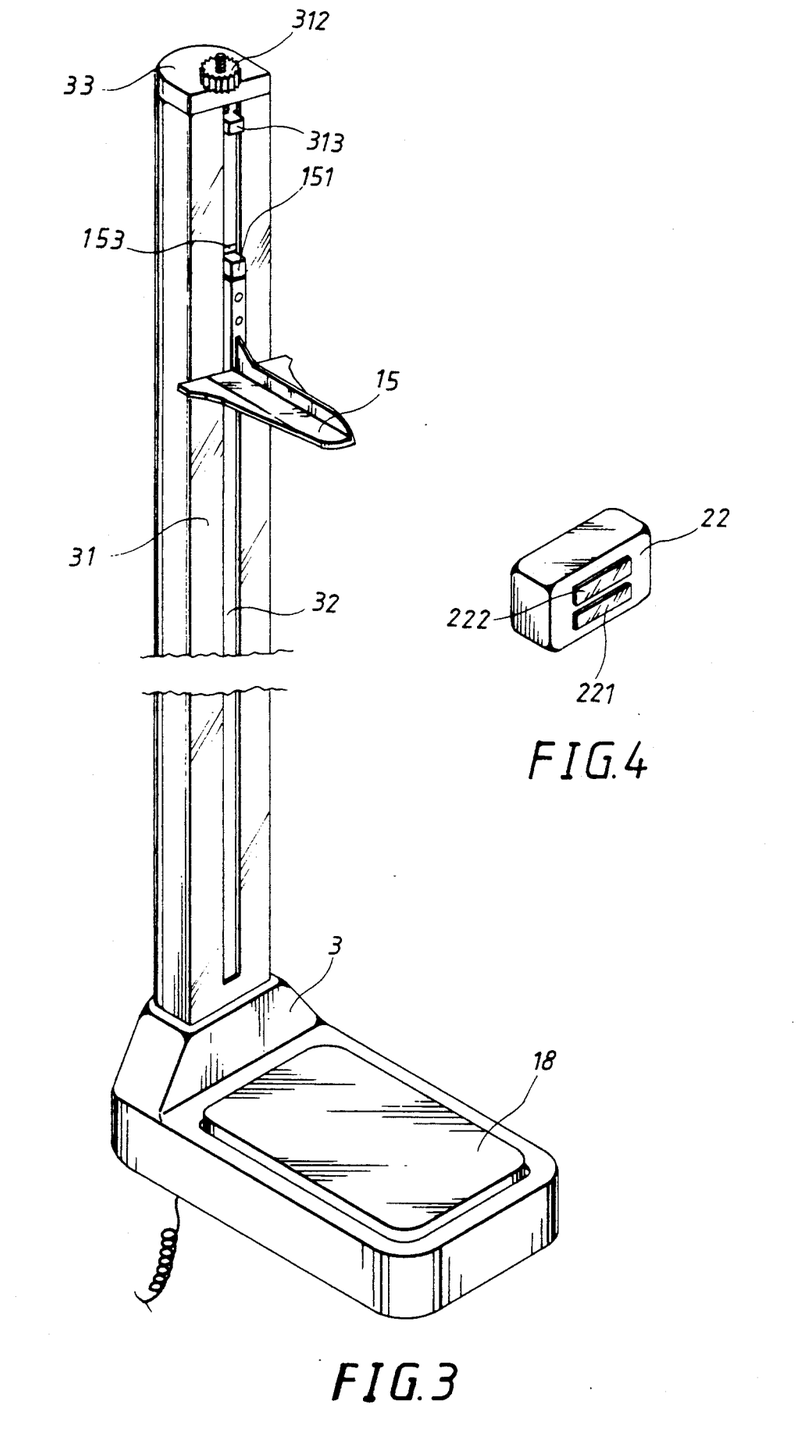
FIG. 3 illustrates the appearance of a measuring unit according to the present invention.
FIG. 4 is a perspective view of the remote receiver according to the present invention.

An embodiment of the measuring unit is shown in FIG. 3. The load cell (18) is supported by a base (3), on which there is a vertical aluminum stand (31) with a sliding channel (32) for vertical displacement of the detecting element (15). The back of the vertical aluminum stand (31) is covered by a back cover (311) which is fixed by means of bolts. A magnet (151) is placed on the top of the detecting element (15) so that it can be positioned at its highest position at the top of the vertical aluminum stand (31) by adhesion to a block (313) beneath a top stop (33) on the top of the vertical aluminum stand (31). The position of the detecting element (15) can be adjusted by an adjusting knob (312) on the top stop (33) for calibration of the reference level for measurement. The remote receiver (2) is separated from the measuring unit. It is in the form of a rectangular structure with two displays (221 and 222) to display the data about height and weight respectively.

FIG. 4 illustrates an arrangement for vertical movement of the detecting element (15). The detecting element (15) has a sliding block (153) with rollers (152) on the back. The sliding block (153) is designed so as it can slide vertically within the vertical aluminum stand (31). A projection (154) is formed in the middle of a lateral side of the sliding block (153). A bolt hole (155) is designed on the projection (154) for fixing to the belt (14) by means of a bolt. The lower turning portion of the belt (14) is engaging with the gear (12) which is located on a support (111). For dynamic balance purpose, a weight (34) is attached to the belt (14).

Figures 5, 6:
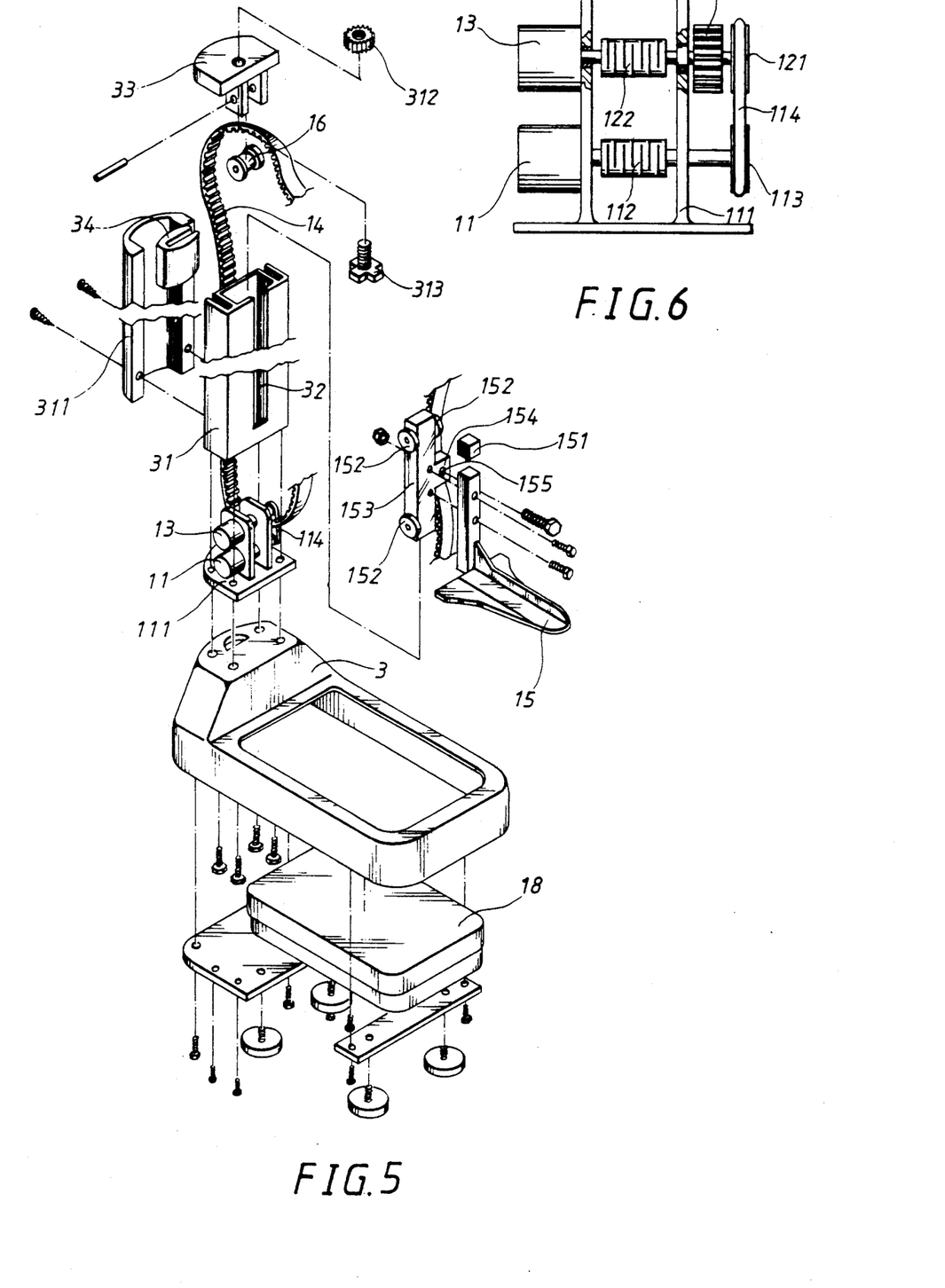
FIG. 5 is a perspective fragmental view of the measuring unit according to the present invention.
FIG. 6 is a sectional view illustrating assembly of the motor, gear, and decoder in the measuring unit according to the present invention.

As shown in FIGS. 4 and 5, the motor (11), the gear (12), and the decoder (13) are placed on a support (111). The motor (11) and the decoder (13) are not placed coaxially. The motor (11) drives a pulley (113) via a coupler (112). The pulley (113) in turn, via a belt (114), drives a pulley (121) incorporated with the gear (12) coaxially above the pulley (113), and the gear (12) drives the spindle of the decoder (13) via a coupler (122). As shown in FIG. 6, the belt (14) is driven by the motor (11) via the gear (12), and the belt (14) causes the sliding block (153) to slide upwards or downwards, and consequently causes the detecting element (15) to rise or fall till the head of person standing on the load cell (18).

Figure 7:
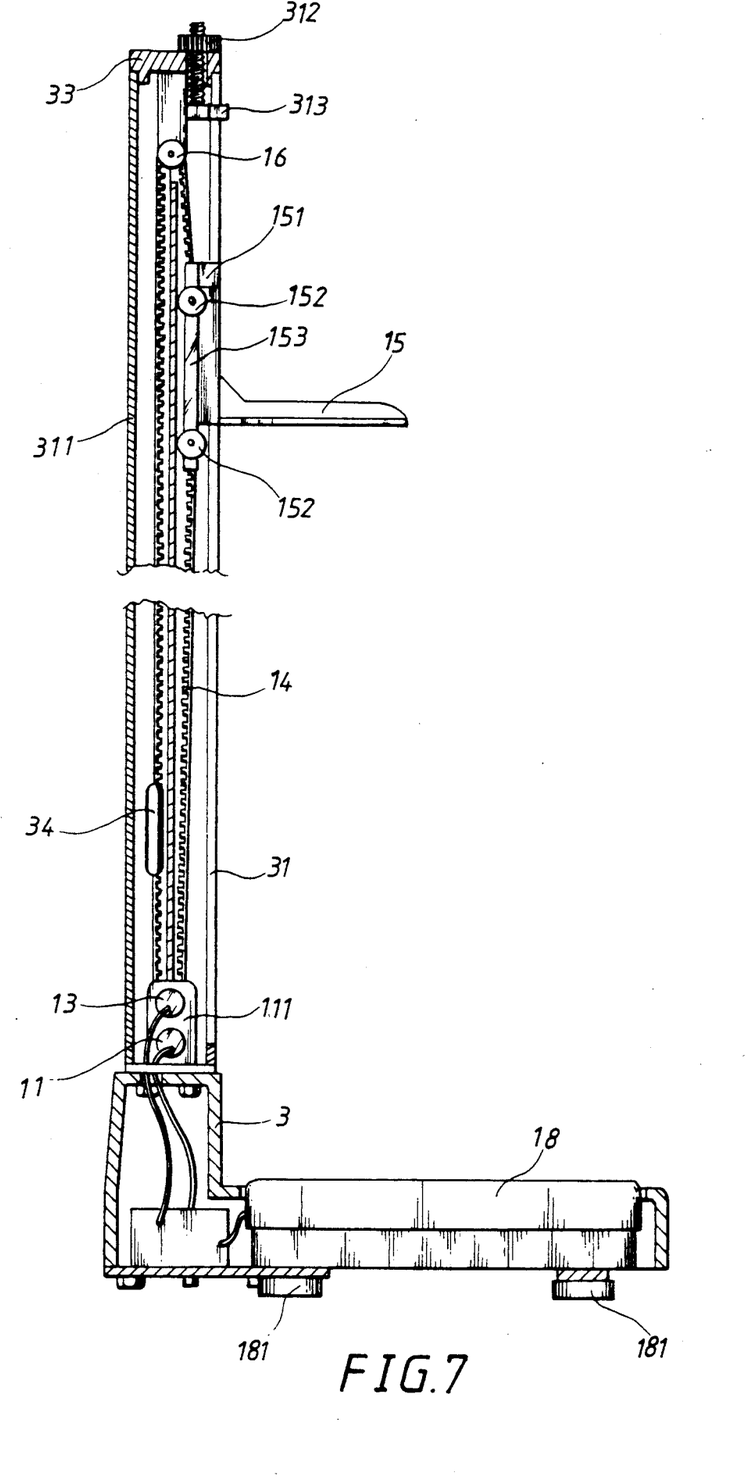
FIG. 7 is a sectional view illustrating assembly of the measuring unit according to the present invention.
Figure 8A:
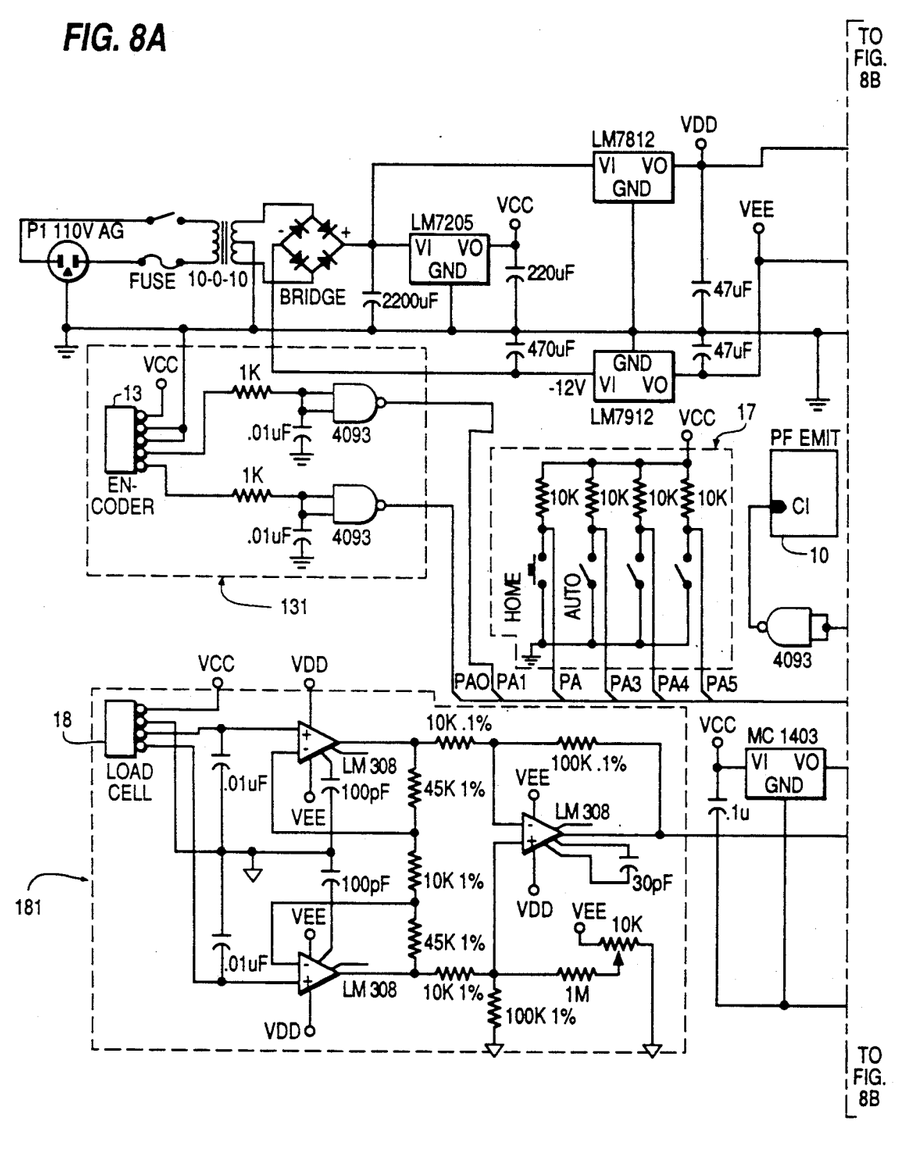
FIGS. 8A and 8B are block diagrams of the remote receiver according to the present invention.
Figure 8B:
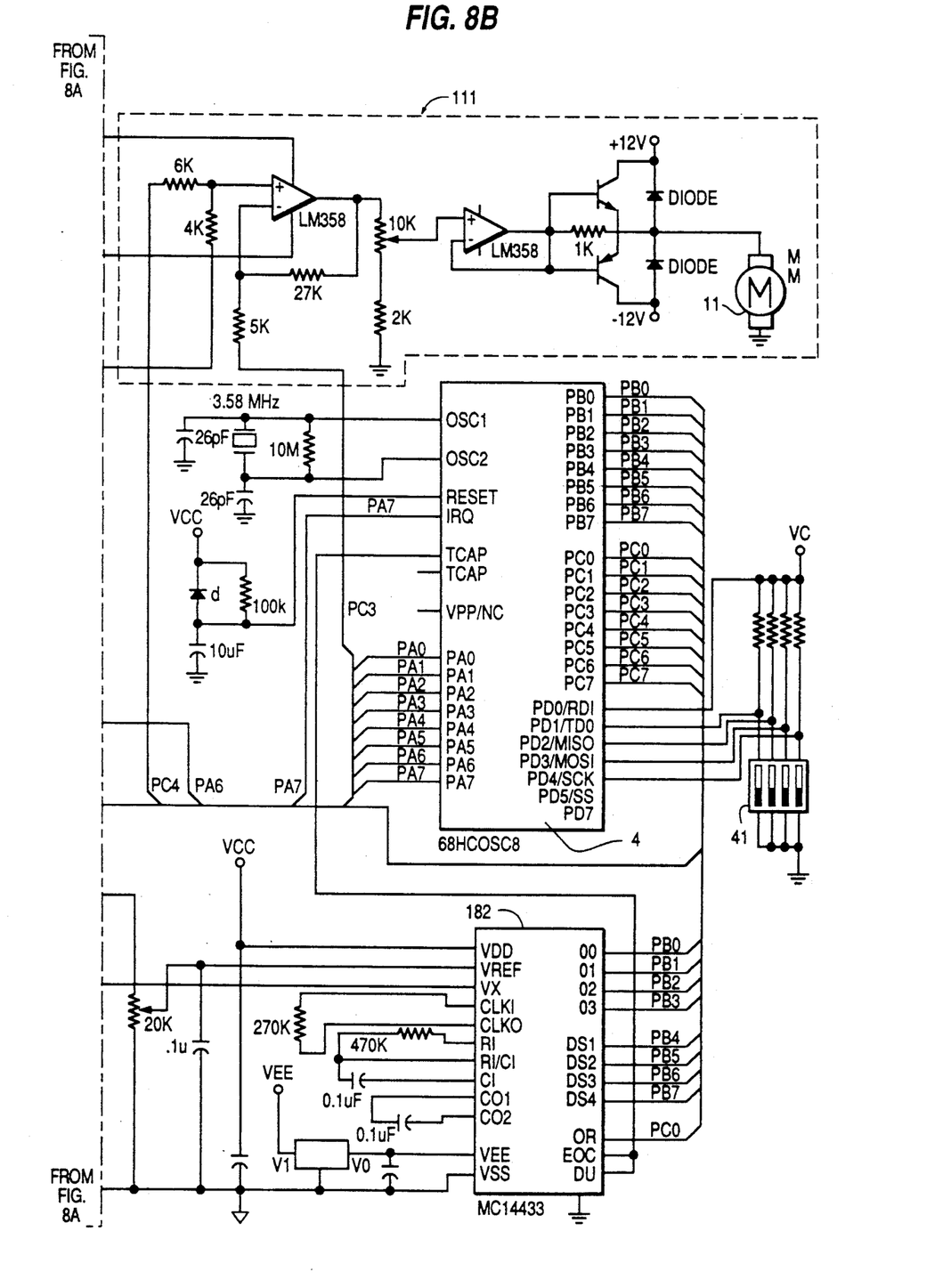

Please refer to FIGS. 7 and 8 for wiring of the measuring unit and circuit diagram of the remote receiver. The measuring unit is connecting to a power source (19), and the remote receiver is connecting to a power source (23). Signal from the load cell (18) is amplified by an amplifier circuit (181) and then led to a central processor unit (4) via an analog-to-digital converter (182). Signal from the decoder (13) is led to the central processor unit (4) through an input circuit (131). A transmitter (10) is used to transmit RF signal according to the status set up by a coding switch (41). The motor (11) is driven by input from the central processor unit (4) through a driving circuit (111).

Figure 9A:
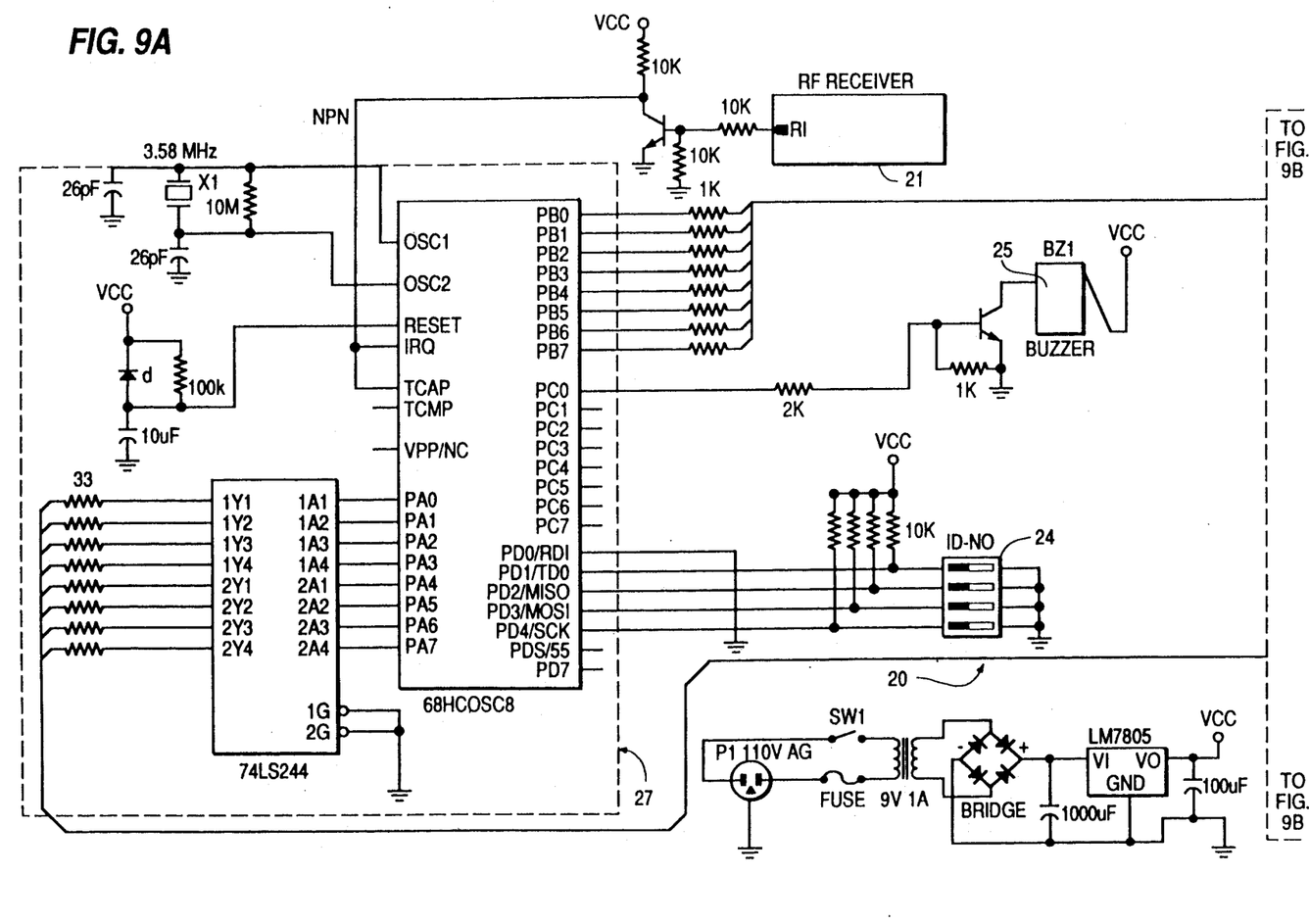
FIGS. 9A and 9B are circuit diagrams of the remote receiver according to the present invention.
Figure 9B:
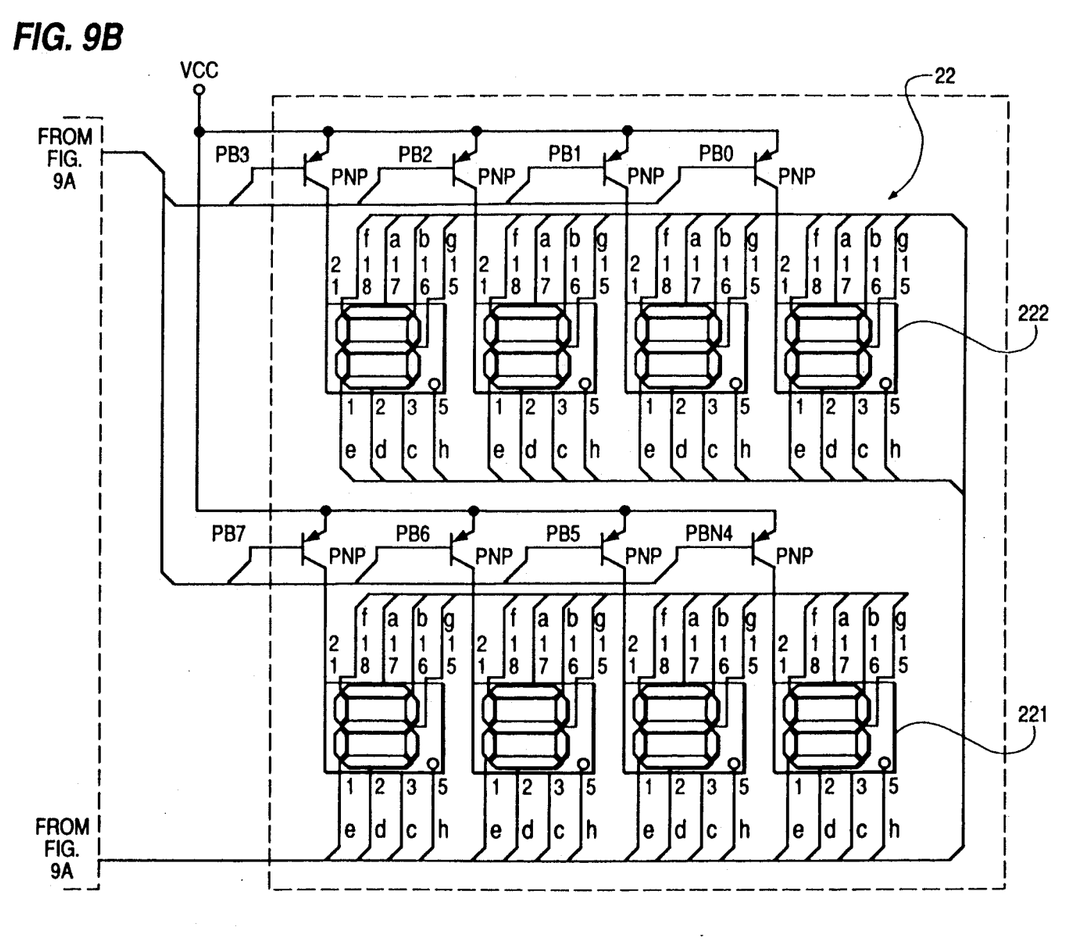

After the signal is received by the receiver (21) in the remote receiver, as shown in FIGS. 8 and 9, it is processed by a central processor unit (27) to provide two data, one for the height, and one for the weight. These data are then displayed in two displays (221 and 222), and a buzzer is initiated to give an alert signal to remind reading and recording of such data.

As described above the present invention has a detecting element which falls down automatically till the head of the person standing on the load cell for measurement of height of the person. Such a measuring method is more accurate than the prior art which applies infrared to detect the height. Moreover, it makes use of a remote receiver with displays to show height and weight, and hence, it is very convenient for measurement and recording of height and weight of a number of persons in sequence. It is indeed a simple, convenient and easy-to-use height and weight measuring machine.

I claim:

1. A height and weight measuring machine comprising a base with a load cell thereon;

a vertical aluminum stand extending upwards from a side of the base, has a sliding channel at the front side, a back cover on the back, and a top stop at the top;

a detecting element designed with a sliding block incorporated with some rollers for vertical sliding within the sliding channel of the vertical aluminum stand;

a belt fixed to a projection formed in the middle of a lateral side of the sliding block by means of a bolt, engaging with a pulley at its upper turning portion and another pulley at its lower turning portion, driven by a motor via a gear located on a support;

a decoder, connected to the said gear via a coupler, and driven by the motor indirectly;

a mother board to receive input signals from the decoder and the load cell, and provide output signals to the motor and a RF transmitter; and a remote receiver including a RF receiver, a central processor unit and a display circuit to receive signals from the mother board and display data about height and weight.

2. A height and weight measuring machine as claimed in claim 1 wherein the display circuit has two displays to display height and weight respectively, and the central processor unit at the remote receiver is incorporated with a buzzer to give an alert signal when the height and weight are displayed.

3. A height and weight measuring machine as claimed in claim 1 wherein the sliding block on the back of the detecting element has a magnet on the top, the top stop on the top of the vertical aluminum stand is incorporated with a block for adhesion of the magnet for positioning when the detecting element reaches its upper limit, and position of the block can be adjusted by an adjusting knob for calibration of the level of the detecting element.

* * * * *